United States Patent
Carr

(10) Patent No.: US 6,498,727 B2
(45) Date of Patent: Dec. 24, 2002

(54) COMPUTER CHASSIS BREAK-AWAY DOOR

(75) Inventor: Daniel Shawn Carr, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 49 days.

(21) Appl. No.: 09/769,542

(22) Filed: Jan. 25, 2001

(65) Prior Publication Data

US 2002/0097561 A1 Jul. 25, 2002

(51) Int. Cl.[7] .................................................. G06F 1/20
(52) U.S. Cl. ........................ 361/725; 361/683; 361/726; 361/755
(58) Field of Search ................................. 361/683, 725, 361/726, 755

(56) References Cited

U.S. PATENT DOCUMENTS

| | | |
|---|---|---|
| 5,422,785 A | 6/1995 | Garrett et al. |
| 5,532,428 A | 7/1996 | Radloff et al. |
| 5,808,863 A | 9/1998 | Radloff et al. |
| 5,852,545 A | 12/1998 | Pan-Ratzlaff |
| 5,935,244 A | 8/1999 | Swamy et al. |
| 6,035,350 A | 3/2000 | Swamy et al. |
| 6,061,234 A | 5/2000 | Broder et al. |
| 6,099,097 A * | 8/2000 | Hocker et al. ............... 312/327 |
| 6,297,948 B1 * | 10/2001 | Buican et al. ............... 361/683 |

* cited by examiner

Primary Examiner—Darren Schuberg
Assistant Examiner—Yean-Hsi Chang
(74) Attorney, Agent, or Firm—Haynes and Boone, LLP

(57) ABSTRACT

A computer chassis door includes a door mounted on the chassis and a hinge pivotally connecting the door on the chassis. The hinge and door have a break-away connection including a pair of spaced apart resilient snap tabs and a snap-in member engaged with the snap tabs.

18 Claims, 7 Drawing Sheets

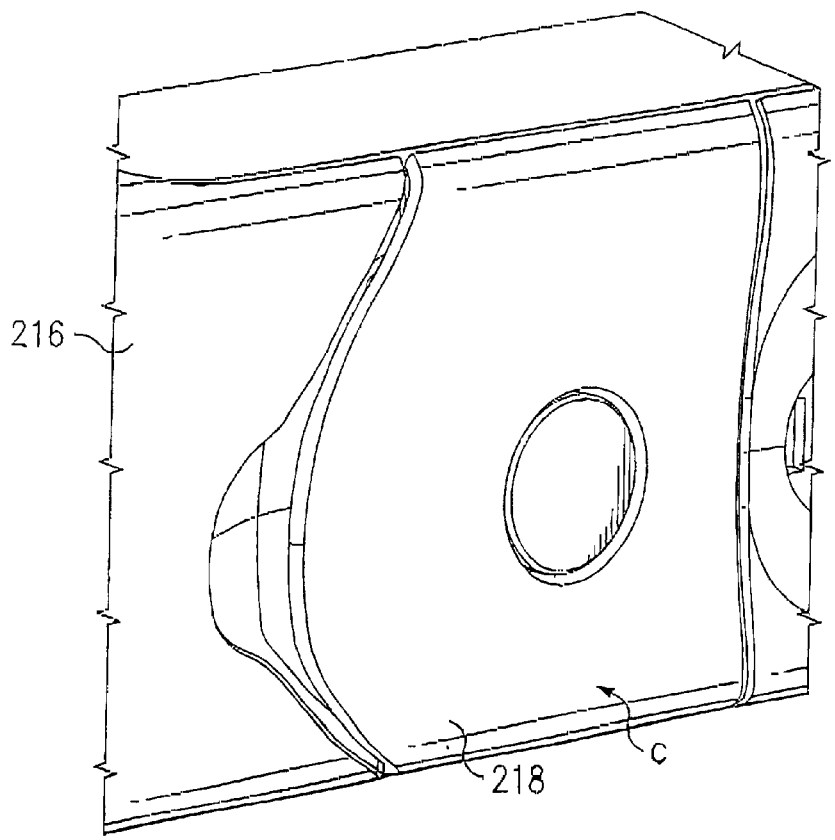
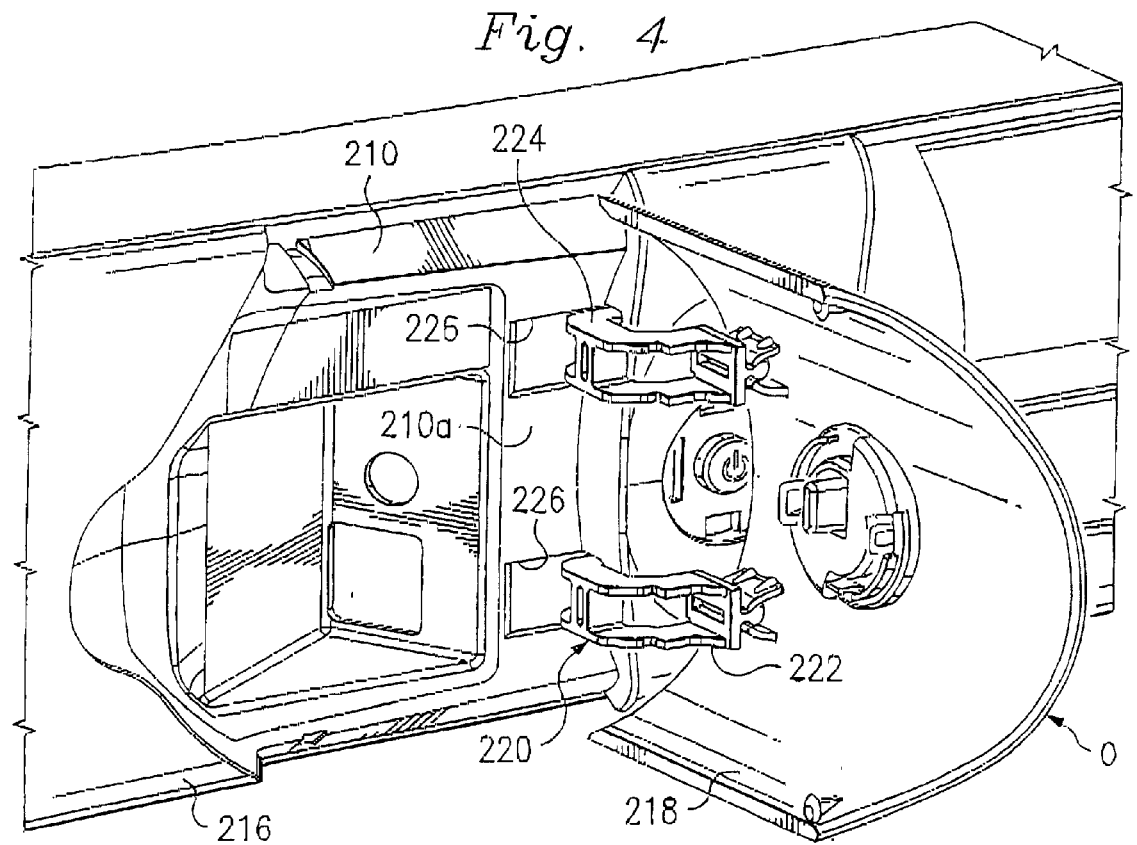

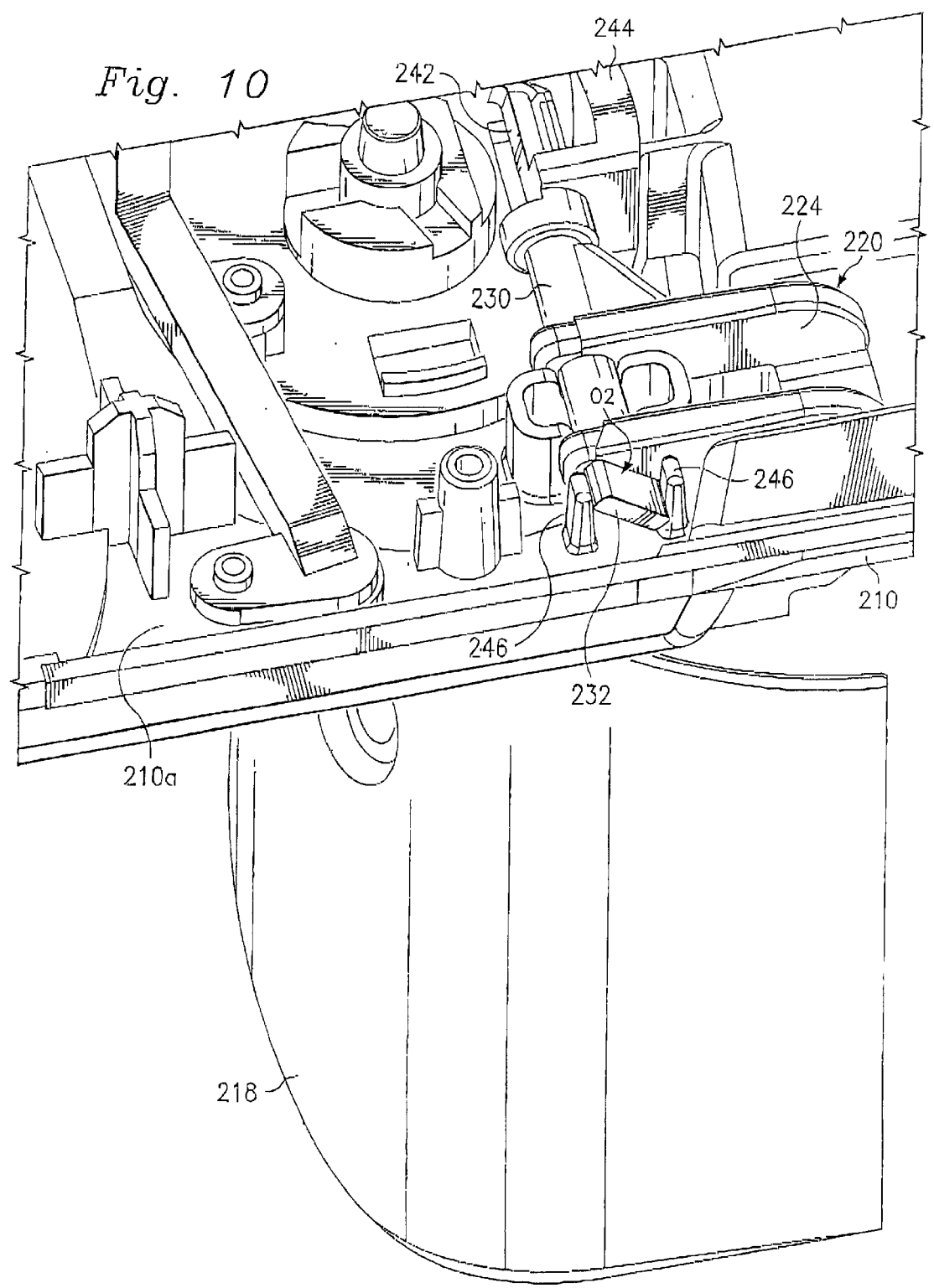

COMPUTER CHASSIS BREAK-AWAY DOOR

BACKGROUND

The disclosures herein relate generally to computer systems and more particularly to a break-away door mounted on a computer chassis.

Computer chassis and/or bezels include doors which cover slots and ports. These doors are subjected to frequent openings and closings and are usually pivotally mounted on the computer chassis or bezel. Because the doors are often exposed in an open position when the ports are being used, they are sometimes subjected to abuse which causes them to break off and separate from their attachment. Some doors are pivotable into the chassis but this takes up valuable space. If a no door solution is used, the ports and slots are then constantly viewable causing an aesthetically unattractive situation.

Therefore, what is needed is a computer chassis door which includes a break-away attachment so that if the door is stressed beyond structural limits, a break-away mechanism will permit the door to separate from the computer without structural damage. The door can then be re-attached.

SUMMARY

One embodiment, accordingly, provides a door which is separable from and re-attachable to a hinge connection on the chassis. To this end, a computer chassis door includes a door mounted on the chassis and a hinge pivotally connecting the door on the chassis. The hinge and door have a break-away connection including a pair of spaced apart resilient snap tabs and a snap-in member engaged with the snap tabs.

A principal advantage of this embodiment is that the door is detachable from the hinge in several directions so as to absorb direct or angular movement relative to the hinge. The door is easy to detach and to re-attach due to the sturdy snap-in structure. The attachment is formed by an inexpensive molded structure.

BRIEF DESCRIPTION OF THE DRAWINGS

FIG. 3 is a partial perspective view illustrating an embodiment of a portion of a bezel and a door in a closed position.

FIG. 4 is a partial perspective view illustrating the door of FIG. 3 in an open position.

FIGS. 8–10 are partial perspective views illustrating an embodiment of the hinge cam extensions for retaining the door in the open and closed positions.

DETAILED DESCRIPTION

Figure 1:
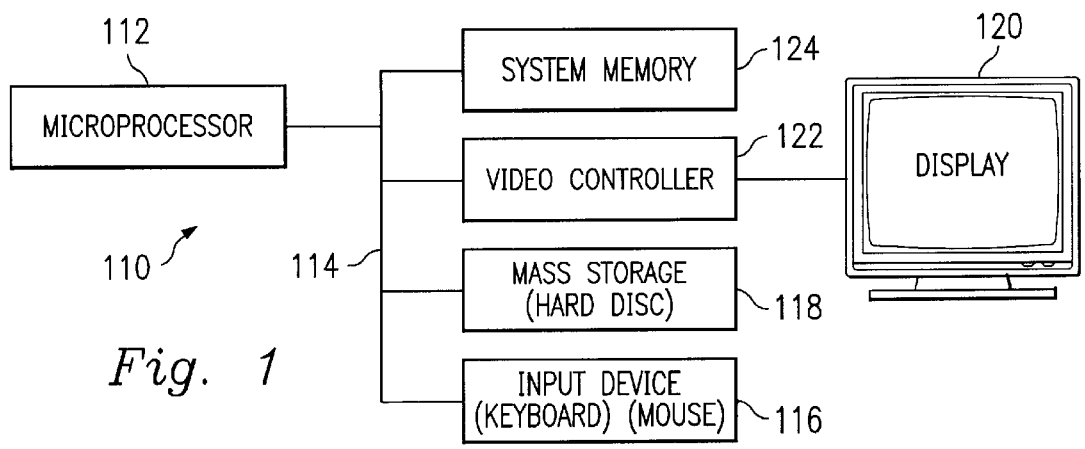
FIG. 1 is a diagrammatic view illustrating an embodiment of a computer system.

In one embodiment, computer system 110, FIG. 1, includes a microprocessor 112, which is connected to a bus 114. Bus 114 serves as a connection between microprocessor 112 and other components of computer system 110. An input device 116 is coupled to microprocessor 112 to provide input to microprocessor 112. Examples of input devices include keyboards, touchscreens, and pointing devices such as mouses, trackballs and trackpads. Programs and data are stored on a mass storage device 118, which is coupled to microprocessor 112. Mass storage devices include such devices as hard disks, optical disks, magneto-optical drives, floppy drives and the like. Computer system 110 further includes a display 120, which is coupled to microprocessor 112 by a video controller 122. A system memory 124 is coupled to microprocessor 112 to provide the microprocessor with fast storage to facilitate execution of computer programs by microprocessor 112. It should be understood that other busses and intermediate circuits can be deployed between the components described above and microprocessor 112 to facilitate interconnection between the components and the microprocessor.

Figure 2:
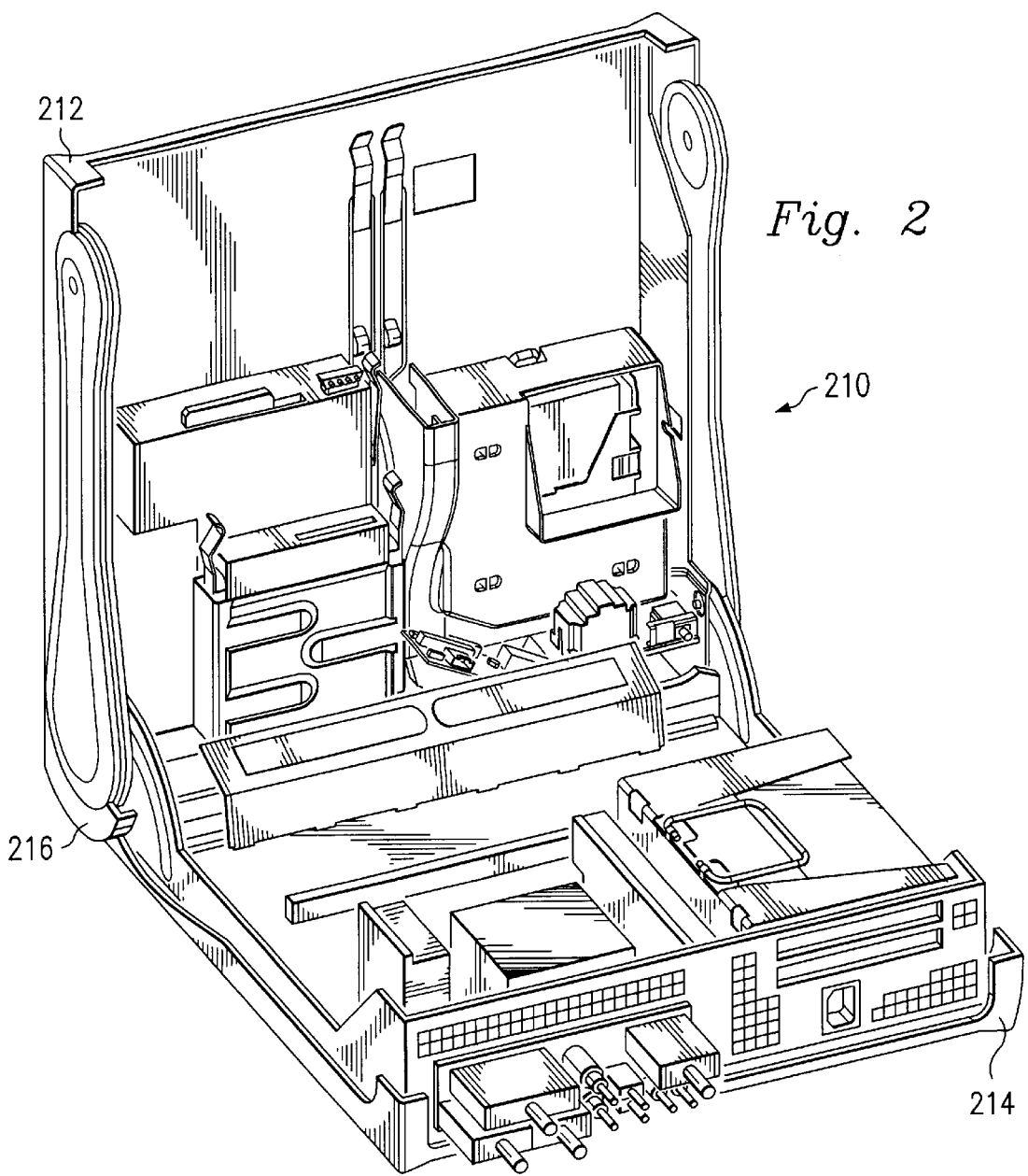
FIG. 2 is a perspective view illustrating an embodiment of a computer chassis.

A computer chassis is generally designated 210 in FIG. 2, shown in an open position, and includes a first portion 212 pivotably connected to a second portion 214 so that the chassis 210 can be pivoted to a closed position wherein first portion 212 is nested with second portion 214. A bezel 216 of chassis 210 requires doors provided for consumer accessible input-output (I/O) devices, e.g., USB ports, audio ports, etc.

Bezel 216, FIG. 3 includes a door 218 mounted thereon and pivotable between a closed position C and an open position O, FIG. 4. The pivotal motion of door 218 is accomplished by a hinge 220 connecting door 218 to the chassis 210. Hinge 220 includes an end 222 connected to door 218 and an opposite end 224 connected to chassis 210. A wall 210a of chassis 210 includes a pair of openings 226 for receiving end 224 of hinge 220. In this manner, end 224 of hinge 220 is connected internally of wall 210a, not visible in FIG. 4, and end 222 extends through openings 226 externally of wall 210a for connection to door 218.

Figure 5:
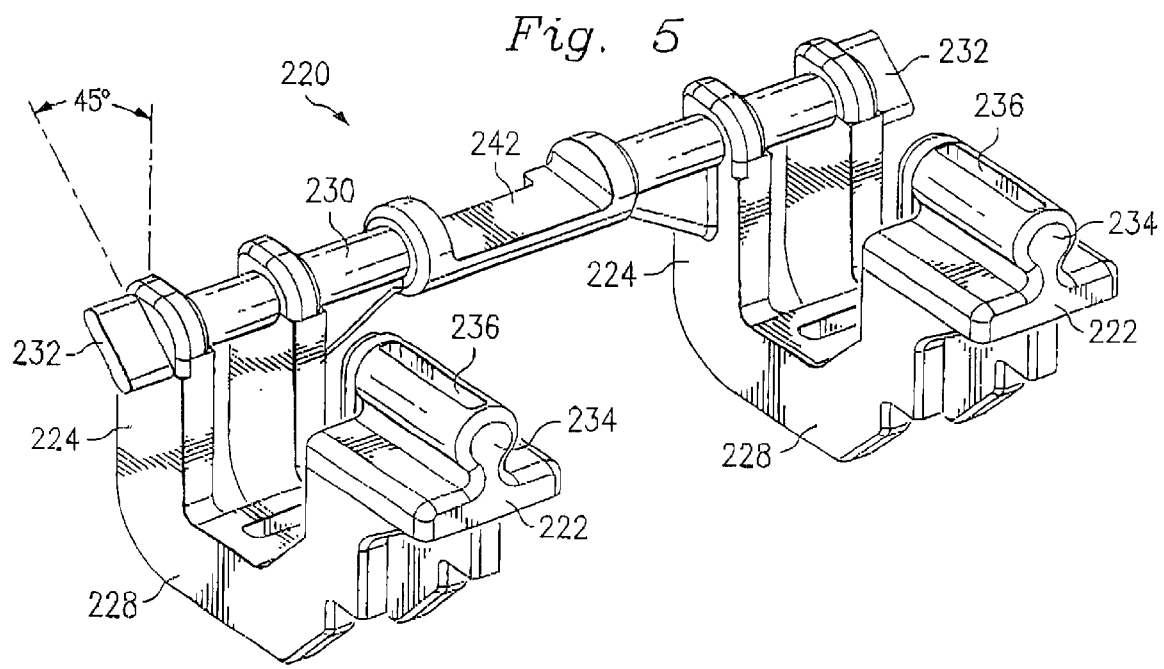
FIG. 5 is a perspective view illustrating an embodiment of a hinge.

Hinge 220, FIG. 5 includes a pair of U-shaped arms 228 interconnected by an axle 230 adjacent end 224. A cam extension 232 is formed on each opposite end of axle 230. Each cam extension 232 is angularly disposed at about a 45° angle relative to a respective adjacent arm 228. End 222 of each arm 228 includes a cylindrical snap-in member 234 including an axial slot 236 formed therein.

Figure 6:
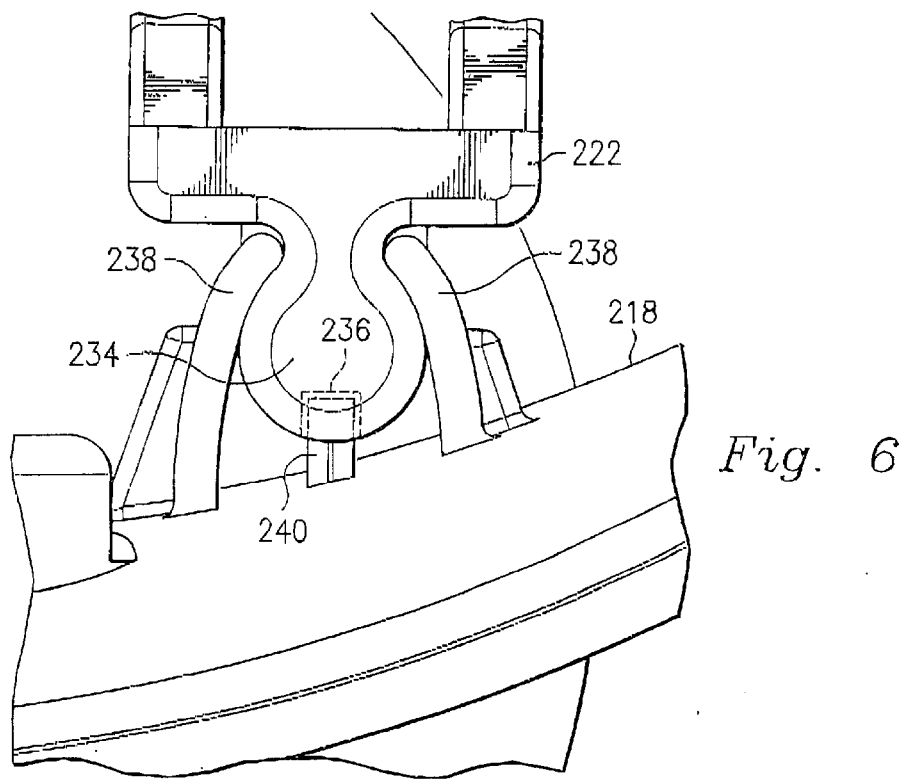
FIG. 6 is a partial perspective view illustrating the hinge connected to the door.
Figure 7:
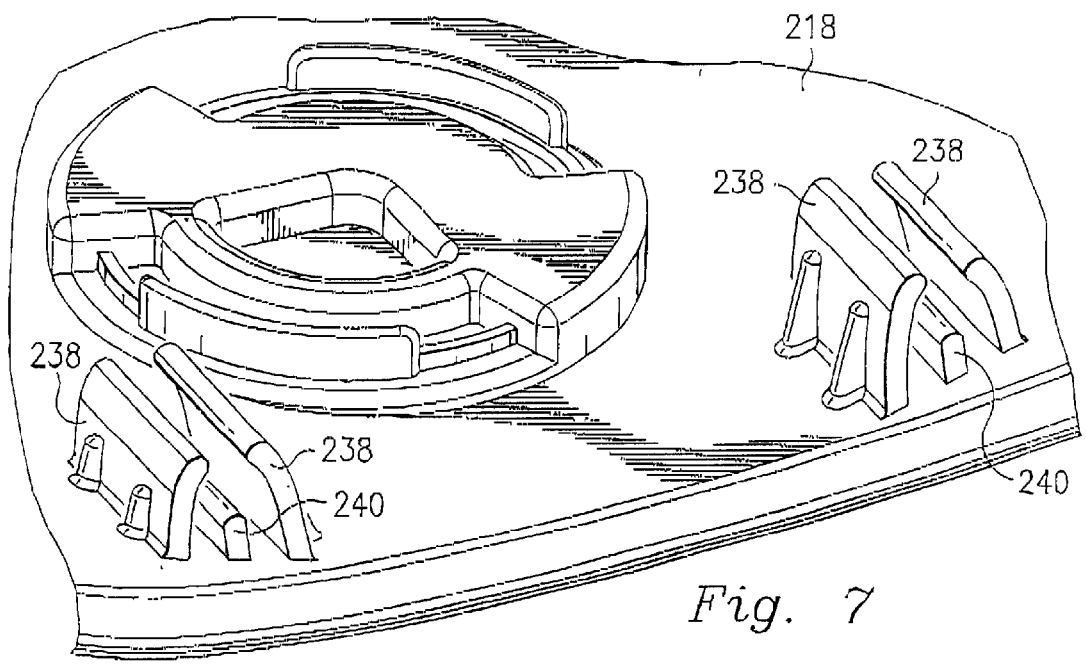
FIG. 7 is a partial perspective view illustrating an embodiment of the door connection for receiving the hinge.

Each snap-in member 234, FIGS. 6 and 7 is received by a respective claw-shaped pair of snap tabs 238 attached to door 218. The snap tabs 238 converge or are inclined toward each other and include an elongated tooth member 240 between each tab for seating in slot 236 when snap-in member 234 is engaged by tabs 238.

End 224, FIGS. 5 and 8–10, of hinge 220 is connected internally of chassis 210 by means of a snap connection with a mid-portion 242 of axle 230 which snaps into an axle receiver 244 on an internal surface of chassis wall 210a. Each cam extension 232 seats between a pair of spaced apart receivers 246 which resiliently engage cam receiver 232 with a positive force.

Figure 8:
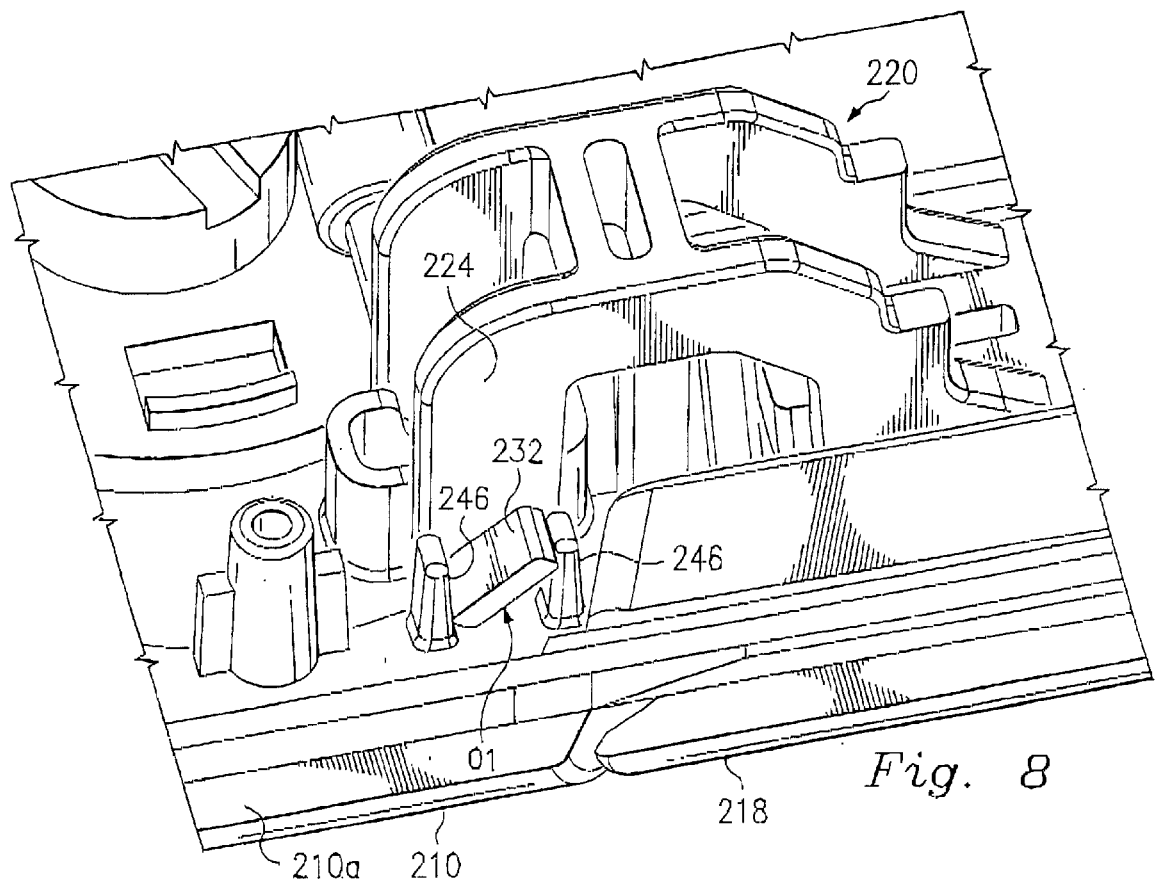

In operation, when door 218 is in the closed position C, FIGS. 3 and 8, cam extensions 232 are angularly disposed in a first orientation O1, between the inwardly flexed receivers 246 which maintain a positive force on extensions 232 to urge door 218 closed. Hinge 220 is positioned within chassis 210.

Figure 9:
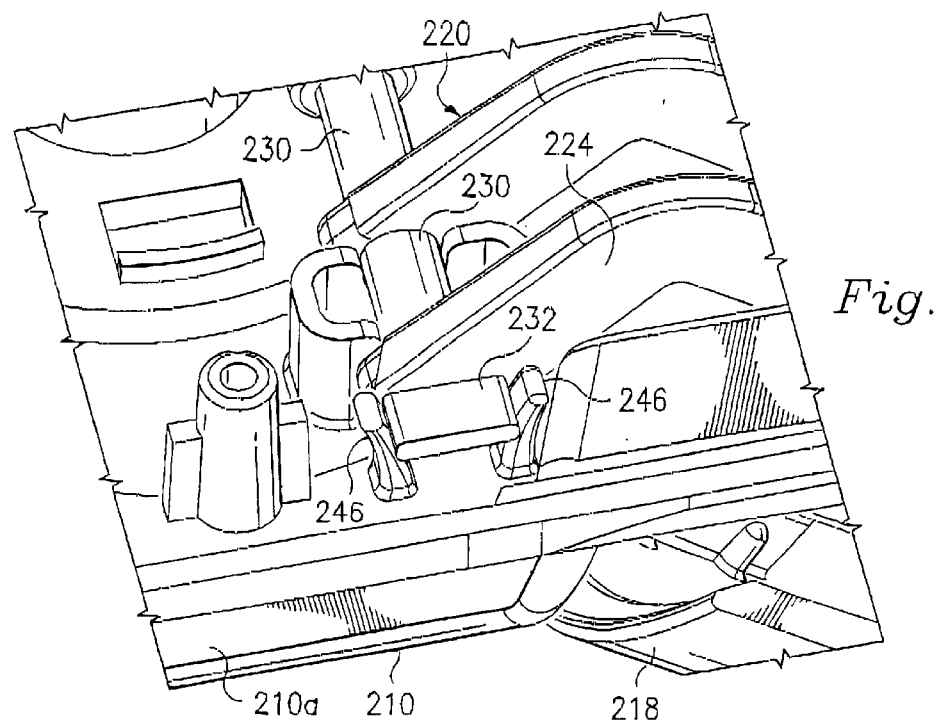

Movement of door 218 towards the open position, FIG. 9, flexes receivers 246 apart and partially extends hinge 220 out of chassis 210. Further movement of door 218, to the fully open position, FIGS. 4 and 10, angularly disposes cam extensions 232 in a second orientation O2, between the inwardly flexed receivers 246 which again maintains a positive force on extensions 232 to urge door 218 open. Hinge 220 is fully extended out of chassis 210.

When the door 218 is fully extended to the open position O, as illustrated in FIG. 4, inadvertent contact with door 218 could damage the hinge 220, the door 218, or both, if the contact is made with sufficient force. Because the door 218 remains open when access to the I/O ports is required, such contact is not unlikely.

Figure 11:
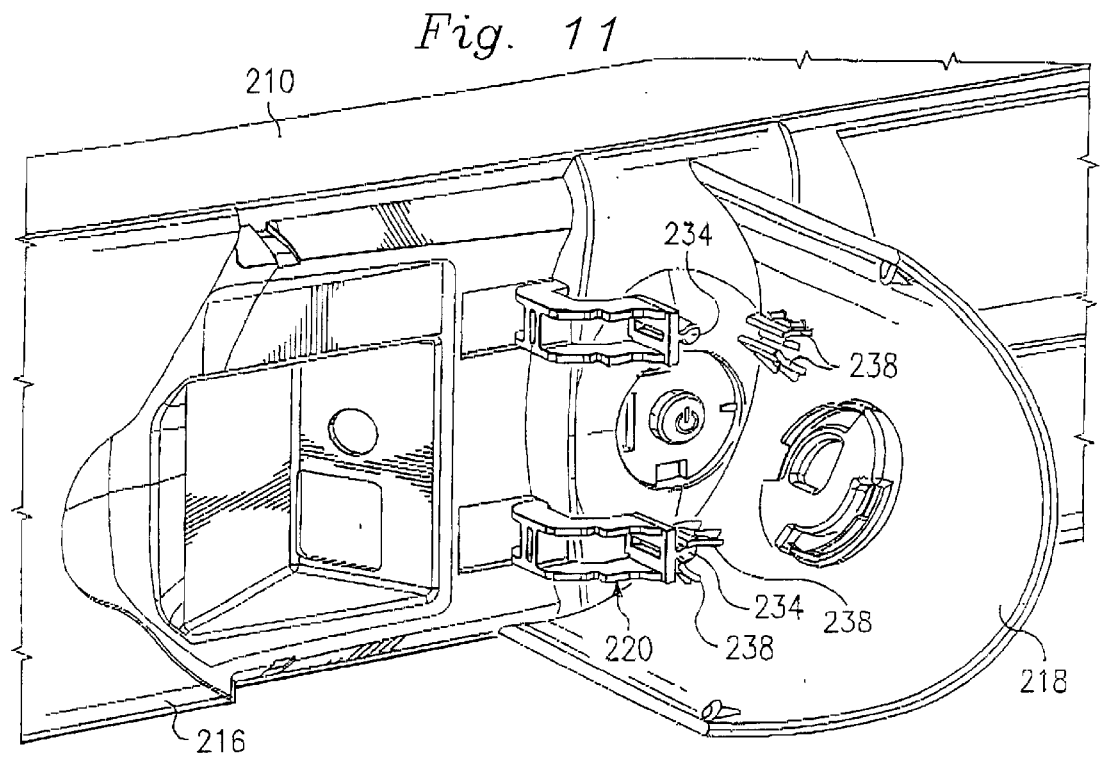
FIGS. 11 and 12 are partial perspective views illustrating an embodiment of the door partially separated from the hinge.
Figure 12:
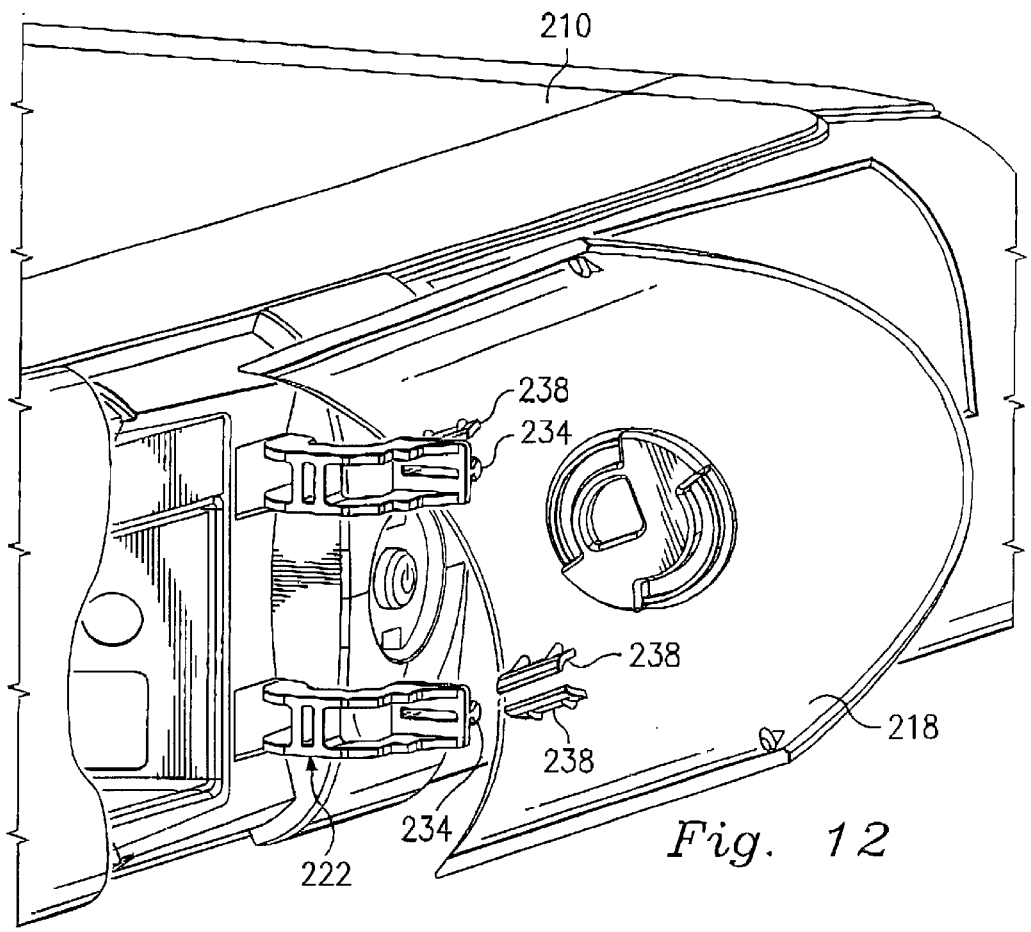
Figure 13:
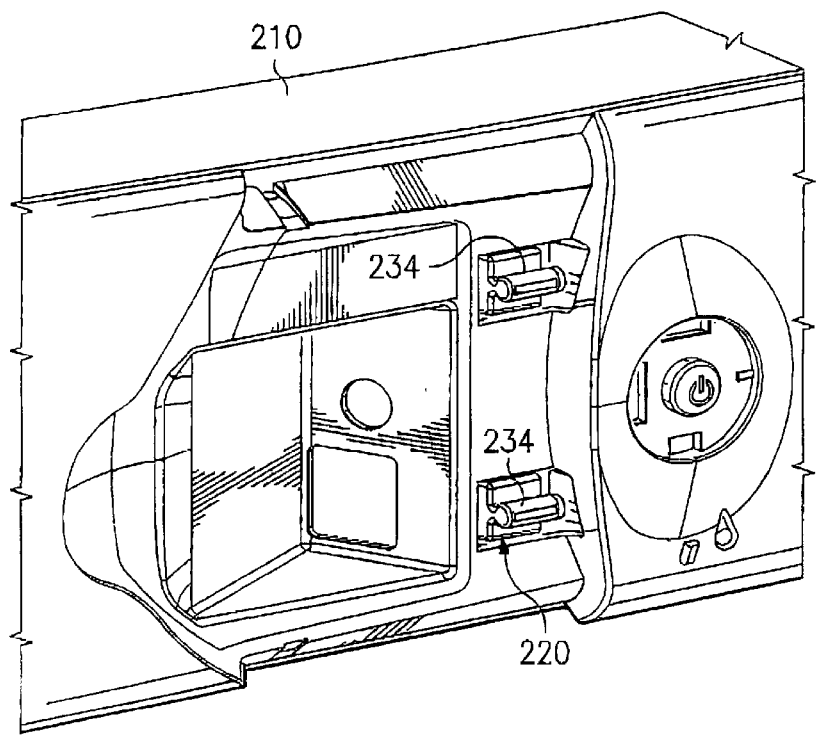
FIG. 13 is a partial perspective view illustrating the hinge having the door removed therefrom.

In the event of sufficient contact with door 218, FIGS. 11–13, a break-away connection between door 218 and hinge 220 avoids such damage. The break-away capability is accomplished by the snap-in connection between the resilient snap tabs 238 and the snap-in cylindrical member 234. In FIG. 11, a first one of the snap-in members 234 is illustrated as separated from its respective snap tab 238, and a second such connection remains attached. In FIG. 12, both snap-in members 234 are separated from their respective snap tabs 238. In FIG. 13, door 218 is completely detached from hinge 220 and the unattached snap-in members 234 are exposed. This could result from an inadvertent contact, or door 218 may be intentionally separated. Re-attachment of door 218 and hinge 220 is easily accomplished by forcing the snap-in cylinders 234 into engagement with the snap tabs 238.

As it can be seen, the principal advantages of these embodiments are that the door is detachable from the hinge in several directions so as to absorb direct or angular movement relative to the hinge. The door is easy to detach and to re-attach due to the sturdy snap-in structure. The attachment is formed by an inexpensive molded structure.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. A computer chassis comprising:
   a chassis;
   a door mounted on the chassis; and
   a hinge pivotally connecting the door on the chassis, the hinge and the door having a break-away connection including:
     a pair of spaced apart snap tabs and an adjacent tooth; and
     a substantially cylindrical snap-in member engaged with the snap tabs, the snap-in member including a groove for engaging the tooth.

2. The chassis as defined in claim 1 wherein the snap tabs are inclined toward each other.

3. The chassis as defined in claim 2 wherein the tooth extends between the snap tabs.

4. The chassis as defined in claim 3 wherein the tooth inserts into the groove.

5. The chassis as defined in claim 1 wherein the snap tabs are attached to the door and the snap-in member is attached to the hinge.

6. The chassis as defined in claim 1 wherein the hinge pivots to extend out of the chassis.

7. A computer housing comprising:
   a chassis;
   a door mounted on the chassis; and
   a hinge pivotally connecting the door on the chassis, the hinge and door having a break-away connection including:
     a pair of resilient claw members and an adjacent tooth mounted on one of the door and the hinge; and
     a substantially cylindrical snap-in member mounted on the other of the door and the hinge, the snap-in member including a groove for engaging the tooth.

8. The housing as defined in claim 7 wherein the resilient claw members are inclined towards each other.

9. The housing as defined in claim 8 wherein the tooth extends between the resilient claw members.

10. The housing as defined in claim 9 wherein the tooth inserts into the groove.

11. The housing as defined in claim 7 wherein the hinge pivots to extend out of the chassis.

12. A computer system comprising:
    a chassis;
    a microprocessor mounted in the chassis;
    a storage coupled to the microprocessor;
    a video controller coupled to the microprocessor;
    a memory coupled to provide storage to facilitate execution of computer programs by the microprocessor;
    a door mounted on the chassis; and
    a hinge pivotally connecting the door on the chassis, the hinge and door having a break-away connection including:
      a pair of spaced apart snap tabs and an adjacent tooth; and
      a substantially cylindrical snap-in member engaged with the snap tabs, the snap-in member including a groove for engaging the tooth.

13. The system as defined in claim 12 wherein the snap tabs are inclined toward each other.

14. The system as defined in claim 13 wherein the tooth extends between the snap tabs.

15. The system as defined in claim 14 wherein the tooth inserts into the groove.

16. The system as defined in claim 12 wherein the snap tabs are attached to the door and the snap-in member is attached to the hinge.

17. The system as defined in claim 12 wherein the hinge pivots to extend out of the chassis.

18. A computer chassis comprising:
    a chassis;
    a door mounted on the chassis; and
    a hinge pivotally connecting the door on the chassis, the hinge and the door having a break-away connection including:
      a pair of spaced apart snap tabs and a tooth extending between the snap tabs; and
      a substantially cylindrical snap-in member including a groove, the snap-in member being engaged between the snap tabs and, simultaneously, the tooth engaging the groove.

* * * * *